(12) United States Patent  
Berthoud

(10) Patent No.: US 7,272,740 B2
(45) Date of Patent: Sep. 18, 2007

(54) PERFORMANCE INDICATION SYSTEM FOR USE WITH A UNIVERSAL SERIAL BUS SIGNAL AND A METHOD OF OPERATION THEREOF

(75) Inventor: Charles W. Berthoud, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 617 days.

(21) Appl. No.: 10/041,146

(22) Filed: Jan. 4, 2002

(65) Prior Publication Data

US 2003/0131267 A1    Jul. 10, 2003

(51) Int. Cl.
  *G06F 1/00*    (2006.01)
(52) U.S. Cl. ..................................... 713/500; 713/501
(58) Field of Classification Search .................. 713/500
  See application file for complete search history.

(56) References Cited

U.S. PATENT DOCUMENTS

| 4,402,271 | A | * | 9/1983 | Heidmann et al. .......... 102/362 |
| 4,491,007 | A | * | 1/1985 | Crowdes, Jr. ................. 73/1.37 |
| 4,768,926 | A | * | 9/1988 | Gilbert, Jr. ................... 416/61 |
| 4,837,488 | A | * | 6/1989 | Donahue ....................... 324/66 |
| 5,365,577 | A | * | 11/1994 | Davis et al. ............. 379/93.17 |
| 5,469,746 | A | * | 11/1995 | Fukunaga et al. ........ 73/861.12 |
| 5,631,758 | A | * | 5/1997 | Knox et al. .................... 398/75 |
| 6,308,215 | B1 | * | 10/2001 | Kolbet et al. ................ 709/233 |
| 6,363,085 | B1 | * | 3/2002 | Samuels ...................... 370/502 |
| 6,393,588 | B1 | * | 5/2002 | Hsu et al. ....................... 714/43 |
| 6,460,094 | B1 | * | 10/2002 | Hanson et al. .................. 710/8 |
| 6,542,946 | B1 | * | 4/2003 | Wooten ...................... 710/106 |
| 6,705,527 | B1 | * | 3/2004 | Kelly et al. ............. 235/472.01 |
| 7,007,119 | B2 | * | 2/2006 | Howard et al. ............. 710/100 |
| 2003/0026183 | A1 | * | 2/2003 | Kitagawa ................... 369/53.3 |

OTHER PUBLICATIONS

"CATC USB Chief Bus and Protocol Analyzer User's Manual", Nov. 9, 2001, Manual Version 1.7.*
"Agere USB 2.0 USS2X1W 16-Bit and USS2X1 8-Bit PHY Chips" Preliminary Data Sheet, Rev. 3; Apr. 2001; 1 page.
"Universal Serial Bus Specification" Revision 2.0; Apr. 27, 2000; 28 pages Only Revison Toc.

* cited by examiner

*Primary Examiner*—Rehana Perveen
*Assistant Examiner*—Tse Chen

(57) ABSTRACT

A performance indication system for use with a Universal Serial Bus (USB) signal. In one embodiment, the performance indication system includes a rate discrimination subsystem that is configured to provide a determination of a data transfer rate of the USB signal corresponding to a full-speed operation and a high-speed operation. The rate discrimination subsystem is coupled to a condition indication subsystem that is configured to provide a signal indicating the data transfer rate.

21 Claims, 3 Drawing Sheets

PERFORMANCE INDICATION SYSTEM FOR USE WITH A UNIVERSAL SERIAL BUS SIGNAL AND A METHOD OF OPERATION THEREOF

TECHNICAL FIELD OF THE INVENTION

The present invention is directed, in general, to computing systems and, more specifically, to a performance indication system for detecting the data transfer rate of a connection employing a signal compliant with a Universal Serial Bus and a method of operating the same.

BACKGROUND OF THE INVENTION

The performance of personal computers has continued to improve since being introduced to the market. Along with the improvements in performance, there has been an increase in the type of applications in which the personal computers are used. Several new applications involve a merger between computing and communications environments.

Originally, the connection of personal computers to telephones created a connectivity problem due to the somewhat isolated development of computing and communications systems. Motivated by the need to create a connection between personal computers and other devices, the Universal Serial Bus Specification (USB Specification) was developed to facilitate interconnectivity. The USB Specification provided an industry standard to enable devices from different vendors to interoperate in an open architecture. The resulting connections from the USB Specification created a ubiquitous link that can be used across a wide range of interconnects at data transfer rates of 12 Mb/s, also known as full-speed, and 1.5 Mb/s.

While the USB Specification did create a flexible connection for keyboards, pointing devices, joysticks, etc., personal computing peripherals have continued to add more performance and functionality. For example, the use of digital imaging demands a high performance connection between the personal computer and the increasingly sophisticated peripherals.

In order to address the demand for improved performance, the industry developed the Universal Serial Bus Specification Revision 2.0 (USB 2.0 Specification). The USB 2.0 Specification addressed the need for higher performance by adding a third data transfer rate of 480 Mb/s, also known as high-speed, to the originally defined data transfer rates of the earlier USB Specification. The new standard has delivered the desired bandwidth increase while preserving the original motivations for the USB Specification and maintaining full compatibility with existing peripherals.

A USB 2.0 connection, however, may not always operate at high-speed. One reason could be due to a flawed cable that degrades signal quality to the point that the cable can no longer support a high-speed operation. The USB 2.0 connection may also be unable to support a high-speed operation due to internal bus traffic that reduces the process speed of information.

Presently, there are some operating systems that produce a warning to users when there is a problem with a peripheral connection. Typically, this warning simply alerts the user that there is not a connection. A user may want to know, however, if the data transfer rate of a particular connection is at full-speed or high-speed. Presently, in order to detect what data transfer rate is being used at a connection, a user must use an oscilloscope to test the connection and obtain the data transfer rate. Alternatively, a user may utilize a bus analyzer to interrogate the connection to determine the data transfer rate.

Accordingly, what is needed in the art is a device that enables a user to detect the data transfer rate associated with connections such as that of a Universal Serial Bus connection.

SUMMARY OF THE INVENTION

To address the above-discussed deficiencies of the prior art, the present invention provides a performance indication system for use with a Universal Serial Bus (USB) such as a Universal Serial Bus Specification Revision 2.0 (USB 2.0) signal. In one embodiment, the performance indication system includes a rate discrimination subsystem configured to provide a determination of a data transfer rate of a USB signal corresponding to a full-speed operation and a high-speed operation. The rate discrimination subsystem is coupled to a condition indication subsystem that is configured to provide a signal indicating the data transfer rate.

In another aspect, the present invention provides a method of operating a performance indication system for use with a USB signal. The method includes determining a data transfer rate of the USB signal corresponding to a full-speed operation and a high-speed operation. The method further includes indicating the data transfer rate after it is determined.

In yet another aspect, the present invention provides a computer system including a central processing unit associated with a keyboard, a pointing device and a monitor. The computer system also includes a performance indication system that includes a rate discrimination subsystem and a condition indication subsystem. The performance indication system is configured to provide a determination of a data transfer rate of the USB signal corresponding to a full-speed operation and a high-speed operation. The condition indication subsystem is coupled to the rate discrimination subsystem, and is configured to provide a signal indicating the data transfer rate.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
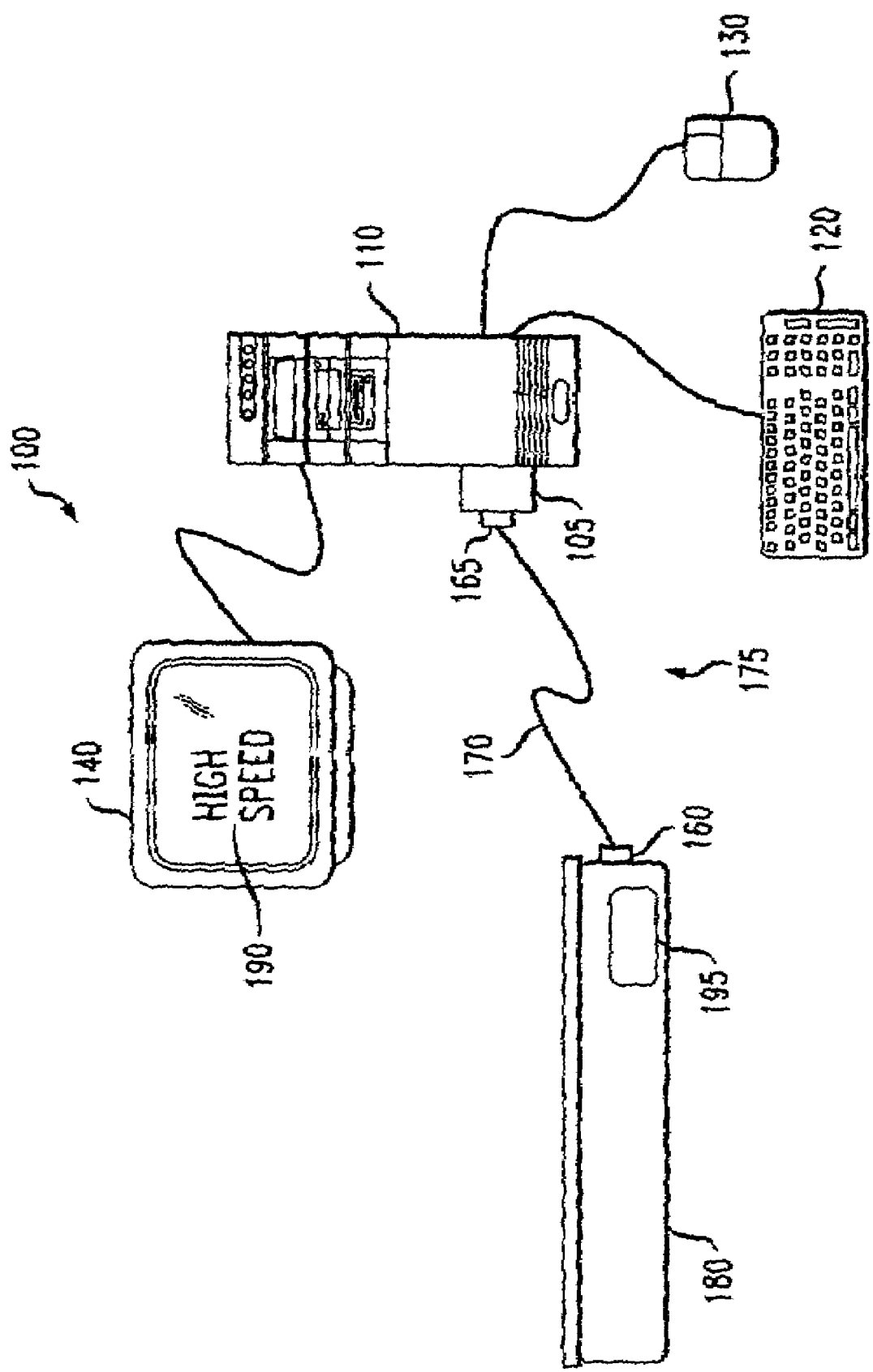
FIG. 1 illustrates a system diagram of an embodiment of a computer system constructed in accordance with the principles of the present invention.

Referring initially to FIG. 1, illustrated is a system diagram of an embodiment of a computer system, generally designated 100, constructed in accordance with the principles of the present invention. The computer system 100 includes a central processing unit 110, a keyboard 120, a pointing device 130, a monitor 140 having a visual display 190, a Universal Serial Bus Specification Revision 2.0 (USB 2.0) cable assembly 175 and a peripheral device 180 having an audible device 195. The USB 2.0 cable assembly includes first and second USB 2.0 connectors 160, 165, and a USB 2.0 cable 170. In FIGS. 1, 2A, 2B and 3, and each corresponding discussion, USB 2.0 is used as an example of a Universal Serial Bus. One skilled in the art will understand that the present invention may also apply to other Universal Serial Bus versions.

The computer system 100 further includes a performance indication system 105. The performance indication system 105 includes a rate discrimination subsystem and a condition indication subsystem that are not shown in FIG. 1. The rate discrimination subsystem is configured to provide a determination of a data transfer rate of a USB 2.0 signal corresponding to a full-speed operation and a high-speed operation. The condition indication subsystem is coupled to the rate discriminating subsystem and is configured to provide a signal indicating the data transfer rate. Both of these subsystems will be discussed in more detail below with respect to FIG. 2B.

In the illustrated embodiment, the central processing unit 110 is a standard processing unit that is commonly available. The keyboard 120, pointing device 130 and monitor 140 associated with the central processing unit 110 are also standard devices commonly used in various computer systems. In FIG. 1, the pointing device 130 is represented by an embodiment of a standard two-button mouse.

The central processing unit 110 is connected to the peripheral device 180 through the performance indication system 105, and via the USB 2.0 cable assembly 175. The USB 2.0 cable assembly 175 terminates in the first USB 2.0 connector 160 at the peripheral device 180 and the second USB 2.0 connector 165 coupled to the performance indication system 105. The USB 2.0 cable assembly 175 will be discussed in more detail below with respect to FIGS. 2A and 2B.

In the illustrated embodiment, the peripheral device 180 is represented by a scanner. In other embodiments, the peripheral device 180 may be another USB 2.0 device. For example, a peripheral device may be a hub or a function as defined in the USB 2.0 Specification by USB 2.0 Promoter Group technical working groups (April 2000), which is incorporated herein by reference and may be located on the Internet at http://www.usb.org/developers/docs.html.

A visual display 190 may be employed in cooperation with the condition indication subsystem of the performance indication system 105. As illustrated, the visual display 190 may be a message that is presented on the monitor 140 of the computer system 100. In other embodiments, a visual display 190 may be a system of lights or a single light employed to indicate the rate of data transfer. In alternative embodiments, the visual display 190 may be located on the central processing unit 110 or on the peripheral device 180. As discussed below with respect to FIG. 2B, the visual display 190 may be located within or in conjunction with the performance indication system 105, as well.

The audible device 195, associated with the peripheral device 180, may also be employed in cooperation with of the condition indication subsystem of the performance indication system 105. The audible device 195 may be a conventional speaker that emits designated sounds based on the data transfer rate determined by the rate discrimination subsystem of the performance indication system 105. In other embodiments, the audible device 195 may emit words or phrases indicating the data transfer rate.

As discussed above with respect to the visual display 190, the audible device 195 may also be contained within the central processing unit 110. In some embodiments the condition indication subsystem of the performance indication system 105 may employ both a visual display 190 and an audible device 195. One skilled in the art will understand that the visual display 190 or the audible device 195 may be positioned in various locations within the computer system 100.

The performance indication system 105 may also be positioned in various locations within the computer system 100. For example, at least a portion of the performance indication system 105 or the entire performance indication system 105 may be located internal to the central processing unit 110. In alternative embodiments, at least a portion of the performance indication system 105 may also be contained in the peripheral device 180. At least a portion of the performance indication system 105 may also be contained in the USB 2.0 cable assembly 175. Locating at least a portion of the performance indication system 105 in a USB 2.0 cable assembly will be more fully discussed below with respect to FIGS. 2A and 2B.

Figure 2A:
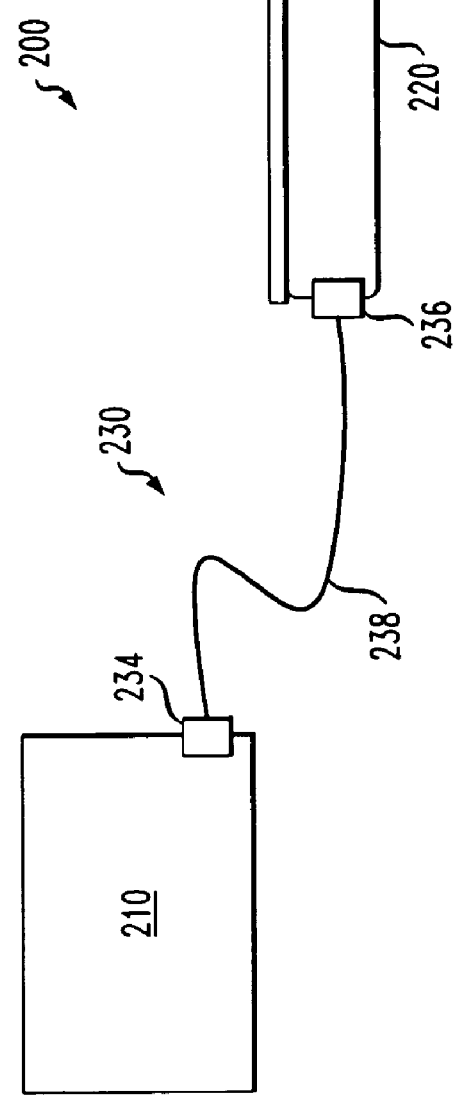
FIG. 2A illustrates a block diagram of an embodiment of a portion of a computer system constructed in accordance with the principles of the present invention.

Turning now to FIG. 2A, illustrated is a block diagram of an embodiment of a portion of a computer system, generally designated 200, constructed in accordance with the principles of the present invention. The portion of a computer system 200 includes a central processing unit 210, a peripheral device 220 and a USB 2.0 cable assembly 230. The USB 2.0 cable assembly 230 includes first and second USB 2.0 terminators 234, 236, and a USB 2.0 cable 238.

As discussed above with respect to FIG. 1, the central processing unit 210 is also a standard device used in a conventional computer system. In FIG. 2A, the peripheral device 220 is represented by an embodiment of a standard scanner. The peripheral device 220 may also be a digital camera, a digital printer, a personal digital assistant or any other USB 2.0 compliant peripheral.

Coupled to the central processing unit 210 is the first USB 2.0 terminator 234. The first USB 2.0 terminator 234 receives the USB 2.0 cable 238, and provides a conduit for transferring data between the USB 2.0 cable 238 and the central processing unit 210. The second USB 2.0 terminator 236 is coupled to the peripheral device 220. Similar to the first USB 2.0 terminator 234, the second USB 2.0 terminator 236 receives the USB 2.0 cable 238, and provides a conduit for transferring data between the USB 2.0 cable 238 and the peripheral device 220. The first and second USB 2.0 terminators 234, 236, are coupled to a USB 2.0 port of the central processing unit 210 and the peripheral device 220, respectively. For more information regarding connecting to a USB 2.0 port or the industry standard for designing and building a USB 2.0 system, see the previously mentioned reference USB 2.0 Specification.

In the illustrated embodiment, the USB 2.0 terminators 234, 236, are located at the central processing unit 210 and the peripheral device 220. The first USB 2.0 terminator 234 and the second USB 2.0 terminator 236 may both be necessary when the central processing unit 210 and the peripheral device 220 are physically separated. For example, the central processing unit 210 and the peripheral device 220 may be located in different rooms or simply separated by a partition. In other embodiments, however, a single USB 2.0 terminator may be used at either the central processing unit 210 or the peripheral device 220, and a standard USB 2.0 connector at the opposing end.

Figure 2B:
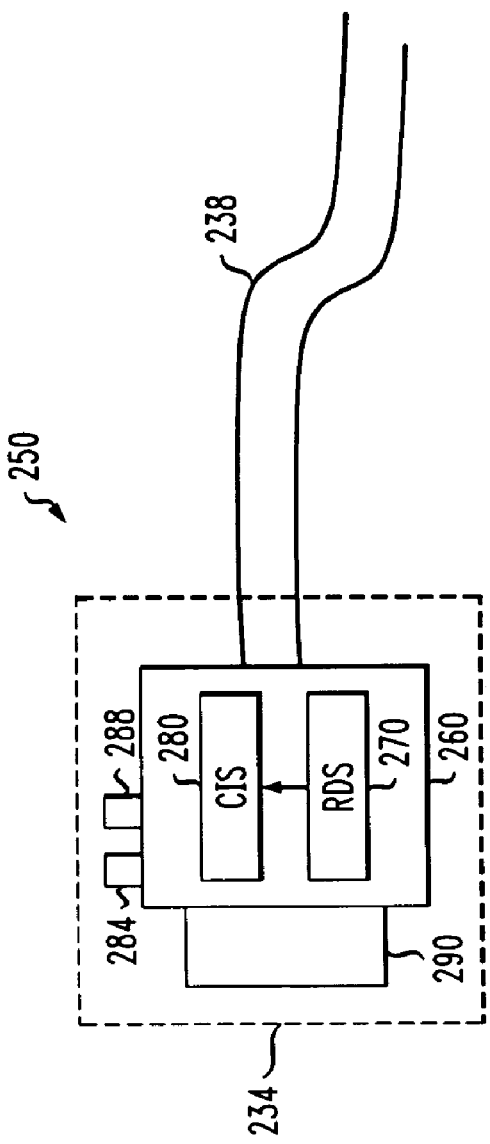
FIG. 2B illustrates a block diagram of an embodiment of a portion of a USB 2.0 cable assembly constructed in accordance with the principles of the present invention.

Turning now to FIG. 2B, illustrated is a block diagram of an embodiment of a portion of a USB 2.0 cable assembly, generally designated 250, constructed in accordance with the principles of the present invention. The portion of a USB 2.0 cable assembly 250 includes the first USB 2.0 terminator 234 and the USB 2.0 cable 238. The first USB 2.0 terminator 234 includes a performance indication system 260 and a USB 2.0 connector 290. The performance indication system 260 includes a rate discrimination subsystem 270 and a condition indication subsystem 280. The condition indication subsystem 280 includes a full-speed visual indicator 284 and a high-speed visual indicator 288.

The rate discrimination subsystem 270 determines the transfer rate of data (a USB 2.0 signal) through the USB 2.0 cable 238. The USB 2.0 cable 238 is a standard cable used for transferring data at full-speed or high-speed as defined by the USB 2.0 Specification. In one embodiment, the rate discrimination subsystem 270 may determine the data transfer rate associated with an outcome of a chirping process. Generally, the chirping process involves an exchange of data transfer rate capability between, for instance, the central processing unit 210 and the peripheral device 220. Once determined, the outcome of the chirping process may be coupled with the rate discrimination subsystem 270 to determine the data transfer rate. One skilled in the pertinent art will understand the chirping process of a USB 2.0 system, and the implementation of its result. Of course, other systems and methods to determine the data transfer rate are well within the broad scope of the present invention.

In another embodiment, the rate discrimination subsystem 270 may determine the data transfer rate through a control signal associated with the USB 2.0 signal. In one embodiment, the control signal may originate from a physical interface (not shown) of the central processing unit 210. In an exemplary embodiment, the physical interface may be an Agere USB 2.0 USS2X1W 16-bit PHY Chip (USS2X1W). The USS2X1W may use a control pin to establish the proper bus impedance for either a full-speed or a high-speed mode. The assertion or de-assertion of the control pin may establish a control signal to indicate the data transfer rate of the USB 2.0 connection. For more information on the USS2X1W, see the "Agere USB 2.0 USS2X1W 16-bit and USS2X1 8-bit PHY Chip Preliminary Data Sheet," Revision 3, Agere Systems Inc., (April 2001), which is incorporated herein by reference.

The rate discrimination subsystem 270 is coupled to the condition indication subsystem 280. Once the data transfer rate is determined, the condition indication subsystem 280 provides an indication of either a full-speed or high-speed data transfer rate. In the illustrated embodiment, the condition indication subsystem 280 employs the full-speed visual indicator 284 and the high-speed visual indicator 288 to indicate the data transfer rate. The full-speed visual indicator 284 and the high-speed visual indicator 288 may be conventional light emitting diodes (LEDs).

In other embodiments, the condition indication subsystem 280 may employ a visual display that is located apart from the USB 2.0 cable assembly 230. For example, a visual display may be located upon the central processing unit 210 or the peripheral device 220. As discussed above with respect to FIG. 1, a visual display may be provided on a monitor of a computer system. One skilled in the pertinent art will understand that the condition indication subsystem 280 may employ a visual display located separately from the performance indication system 260.

The USB 2.0 connector 290 is coupled to the performance indication system 260. The USB 2.0 connector 290 is a conventional USB 2.0 connector as defined by the USB 2.0 Specification. The USB 2.0 connector 290 provides the physical connection of the USB 2.0 cable 238 to the central processing unit 210 for the first USB 2.0 terminator 234.

Figure 3:
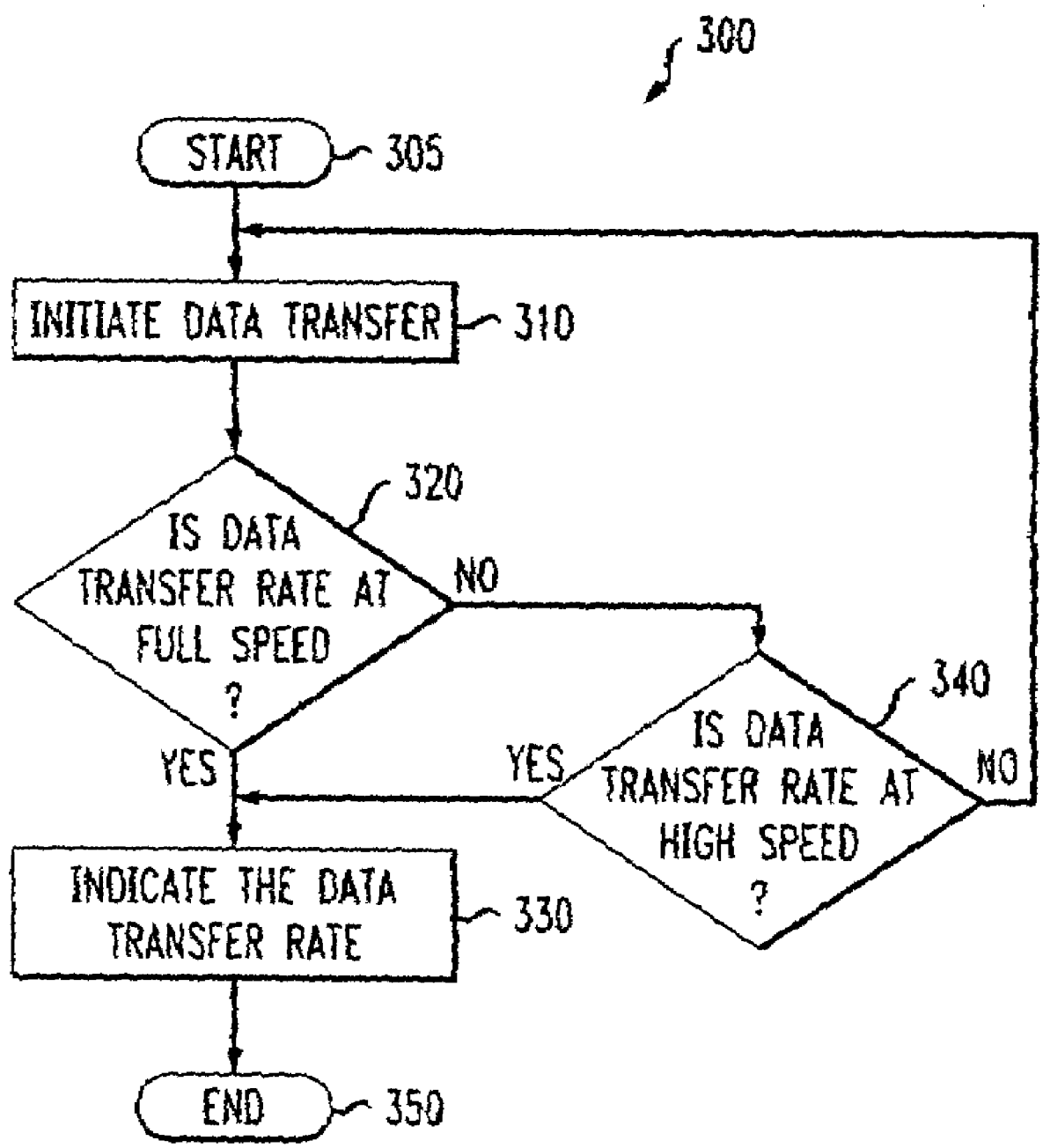
FIG. 3 illustrates a flow diagram of an embodiment of a method of operating a performance indication system for use with a USB 2.0 signal constructed in accordance with the principles of the present invention.

Turning now to FIG. 3, illustrated is a flow diagram of an embodiment of a method, generally designated 300, of operating a performance indication system for use with a USB 2.0 signal constructed in accordance with the principles of the present invention. The method 300 starts in a step 305 with an intent to operate a peripheral device employing a USB 2.0 cable assembly.

Following the step 305, a user initiates data transfer in a step 310. In one embodiment, the user may simply connect a USB 2.0 compliant peripheral to a central processing unit also referred to as a USB 2.0 host. In other embodiments, a user may initiate data transfer through an operating system of a central processing unit through an associated keyboard or pointing device.

After initiating data transfer, the rate discrimination subsystem determines if the data transfer rate of the USB 2.0 signal is at full-speed in a first decisional step 320. The rate discrimination subsystem may determine the data transfer rate through circuitry contained in a USB 2.0 cable assembly. The rate discrimination subsystem may also determine the data transfer rate through circuitry contained in a peripheral device. In some embodiments, determining the data transfer rate may be based on the outcome of a chirping process. In other embodiments, however, a control signal associated with the USB 2.0 signal may be employed to determine the data transfer rate.

After determining that the data transfer rate is at full-speed, the data transfer rate is indicated in a step 330. The data transfer rate may be indicated by circuitry associated with a USB 2.0 cable assembly, circuitry associated with a peripheral device or circuitry associated with a central processing unit. In one embodiment, indicating the data transfer rate may be accomplished by employing a visual display. In alternative embodiments, at least a portion of indicating the data transfer rate may employ an audible device. Finally, operating a performance indication system for use with a USB 2.0 signal ends in a step 370.

Returning now to the first decisional step 320, if the data transfer rate is not at full-speed, then the method 300 proceeds to a second decisional step 340 wherein the rate discrimination subsystem determines if the data transfer rate is at high-speed. If the data transfer rate is at high-speed, then the data transfer rate is indicated in the previously mentioned step 330. If the data transfer rate is not at high-speed, then the method proceeds to initiate data transfer in the previously mentioned step 310.

Although the present invention has been described in detail, those skilled in the art should understand that they can make various changes, substitutions and alterations herein without departing from the spirit and scope of the invention in its broadest form.

What is claimed is:

1. For use with a Universal Serial Bus (USB) 2.0 signal capable of having multiple data transfer rates, a performance indication system, comprising:
   a rate discrimination subsystem configured to provide a determination of a data transfer rate of said USB signal corresponding to one of said multiple data transfer rates, said USB signal traversing through a single USB cable coupling a peripheral device to a host device; and
   a condition indication subsystem coupled to said rate discrimination subsystem and configured to indicate said data transfer rate to a user, wherein at least a portion of said performance indication system is contained in a USB terminator configured to connect said peripheral device to said host device via said single USB cable.

2. The performance indication system as recited in claim 1 wherein said rate discrimination subsystem and said condition indication subsystem are both contained in said USB terminator.

3. The performance indication system as recited in claim 1 wherein at least a portion of said performance indication system is contained in a peripheral device.

4. The performance indication system as recited in claim 1 wherein said condition indication subsystem employs a visual display to indicate said data transfer rate to said user.

5. The performance indication system as recited in claim 1 wherein said condition indication subsystem employs an audible device to indicate said data transfer rate to said user.

6. The performance indication system as recited in claim 1 wherein said determination of said data transfer rate is based on an outcome of a chirping process.

7. The performance indication system as recited in claim 1 wherein said rate discrimination subsystem employs a control signal associated with said USB signal for said determination of said data transfer rate.

8. A method of operating a performance indication system for use with a Universal Serial Bus (USB) 2.0 signal capable of having multiple data transfer rates, comprising;
   determining a data transfer rate of said USB signal corresponding to one of said multiple data transfer rates as said USB signal traverses through a single USB cable coupling a peripheral device to a host device; and
   indicating said data transfer rate to a user via a USB terminator configured to connect said peripheral device to said host device via said single USB cable.

9. The method as recited in claim 8 wherein said USB terminator is part of a USB cable assembly.

10. The method as recited in claim 8 wherein said determining is performed in circuitry contained in said USB terminator.

11. The method as recited in claim 8 wherein at least a portion of said indicating said data transfer rate employs a visual display.

12. The method as recited in claim 8 wherein at least a portion of said indicating said data transfer rate employs an audible device.

13. The method as recited in claim 8 wherein said determining of said data transfer rate is based on an outcome of a chirping process.

14. The method as recited in claim 8 wherein said USB terminator includes first and second light emitting diodes, said indicating employing said first light emitting diode to indicate one of said multiple data transfer rates and said second light emitting diode to indicate an other of said multiple data transfer rates.

15. For use with a Universal Serial Bus (USB) 2.0 signal capable of having multiple data transfer rates, a USB terminator configured to connect to and terminate a USB cable at a host or peripheral device comprising;
   a rate discrimination subsystem configured to provide a determination of a data transfer rate of said USB signal corresponding to one of said multiple data transfer rates; and
   a condition indication subsystem coupled to said rate discrimination subsystem and configured to indicate said data transfer rate to a user.

16. The USB terminator as recited in claim 15 wherein said USB terminator is permanently connected to said USB cable.

17. The USB terminator as recited in claim 15 wherein the said condition indication subsystem employs a visual display to indicate said data transfer rate to said user.

18. The USB terminator as recited in claim 15 wherein said condition indication subsystem indicates said data transfer rate to said user via a message presented on a monitor of a computer system.

19. The USB terminator as recited in claim 15 wherein said condition indication subsystem employs an audible device to indicate said data transfer rate to said user.

20. The USB terminator as recited in claim 15 wherein said determination of said data transfer rate is based on an outcome of a chirping process.

21. The USB terminator as recited in claim 15 wherein said rate discrimination subsystem employs a control signal associated with said USB signal for said determination of said data transfer rate.

* * * * *